(12) United States Patent
Kawahara et al.

(10) Patent No.: US 8,904,844 B2
(45) Date of Patent: Dec. 9, 2014

(54) METHOD OF MANUFACTURING SPROCKET SEGMENT, AND SPROCKET SEGMENT

(75) Inventors: Fumiaki Kawahara, Hirakata (JP); Tao Wang, Hirakata (JP); Shohei Kusada, Hirakata (JP)

(73) Assignee: Komatsu Ltd., Tokyo (JP)

( * ) Notice: Subject to any disclaimer, the term of this patent is extended or adjusted under 35 U.S.C. 154(b) by 445 days.

(21) Appl. No.: 13/147,843

(22) PCT Filed: Feb. 9, 2010

(86) PCT No.: PCT/JP2010/051902
§ 371 (c)(1),
(2), (4) Date: Aug. 4, 2011

(87) PCT Pub. No.: WO2010/095542
PCT Pub. Date: Aug. 26, 2010

(65) Prior Publication Data
US 2011/0306453 A1    Dec. 15, 2011

(30) Foreign Application Priority Data

Feb. 19, 2009  (JP) ................. 2009-036961

(51) Int. Cl.
| | | |
|---|---|---|
| E02F 9/02 | (2006.01) | |
| E02F 9/20 | (2006.01) | |
| B21J 5/00 | (2006.01) | |
| B21J 5/02 | (2006.01) | |
| B21K 1/30 | (2006.01) | |
| B21K 23/02 | (2006.01) | |
| F16H 55/12 | (2006.01) | |
| F16H 55/30 | (2006.01) | |

(52) U.S. Cl.
CPC ... *E02F 9/20* (2013.01); *B21J 5/00* (2013.01); *B21J 5/02* (2013.01); *B21K 1/30* (2013.01); *B21K 23/02* (2013.01); *E02F 9/02* (2013.01); *F16H 55/12* (2013.01); *F16H 55/30* (2013.01)
USPC ........ 72/354.2; 29/893.3; 29/893.34; 72/356; 72/357; 72/360; 474/162

(58) Field of Classification Search
USPC ............ 474/162; 29/893.34, 893.3; 72/354.2, 72/356, 357, 360
See application file for complete search history.

(56) References Cited

U.S. PATENT DOCUMENTS

| | | | |
|---|---|---|---|
| 3,439,551 A * | 4/1969 | Militana | ................ 474/162 |
| 3,960,412 A * | 6/1976 | Shuler | ................ 305/199 |
| 4,420,962 A | 12/1983 | Peterson | |
| 4,517,819 A | 5/1985 | Sandroni | |
| 4,594,876 A * | 6/1986 | Zorn et al. | ................ 72/414 |
| 5,026,329 A * | 6/1991 | Diekevers | ................ 474/162 |

(Continued)

FOREIGN PATENT DOCUMENTS

| | | |
|---|---|---|
| JP | 52-30994 | 3/1977 |
| JP | 58-17895 B2 | 4/1983 |

(Continued)

OTHER PUBLICATIONS

International Search Report of corresponding PCT Application No. PCT/JP2010/051902.

*Primary Examiner* — William A Rivera
*Assistant Examiner* — Michael Riegelman
(74) *Attorney, Agent, or Firm* — Global IP Counselors, LLP

(57) ABSTRACT

A method of manufacturing a sprocket segment that is formed by forging as one of a plurality of circumferentially divided parts of a sprocket having a plurality of teeth arranged on an outer peripheral surface of a circular flange, the method includes: forming a material of the sprocket segment into an initial formed state in an initial forming step; and subjecting the sprocket segment in dies to a finish forming process with a tooth trace direction of the sprocket segment as viewed in cross-section of the sprocket segment being inclined relative to a forging direction of the dies in a finish forming step.

6 Claims, 11 Drawing Sheets

(56) References Cited

U.S. PATENT DOCUMENTS 5,380,254 A 1/1995 Maguire et al.
5,752,407 A * 5/1998 Becker et al. .................. 72/475

FOREIGN PATENT DOCUMENTS

| | | |
|---|---|---|
| JP | 58-501664 A | 10/1983 |
| JP | 60-102247 A | 6/1985 |
| JP | 60-181238 U | 12/1985 |
| JP | 60-181239 U | 12/1985 |
| JP | 3-39773 B2 | 6/1991 |
| JP | 3-41251 B2 | 6/1991 |
| JP | 3-41252 B2 | 6/1991 |
| JP | 7-501492 A | 2/1995 |
| JP | 10-137890 A | 5/1998 |

* cited by examiner

METHOD OF MANUFACTURING SPROCKET SEGMENT, AND SPROCKET SEGMENT

CROSS-REFERENCE TO RELATED APPLICATIONS

This national phase application claims priority to Japanese Patent Application No. 2009-036961 filed on Feb. 19, 2009. The entire disclosure of Japanese Patent Application No. 2009-036961 is hereby incorporated herein by reference.

TECHNICAL FIELD

The present invention relates to method of manufacturing a sprocket segment, die equipment for manufacturing a sprocket segment, and a sprocket segment to compose a sprocket of tracked vehicle including a construction machine such as bulldozer and agricultural vehicle.

BACKGROUND INFORMATION

A sprocket has a plurality of teeth are arranged on the outer peripheral part of the sprocket. In the case of a large sprocket used for a lower traveling unit of a tracked vehicle such as construction machine (e.g., hydraulic excavator, and bulldozer) and agricultural vehicle, even recent years, it is difficult to integrally form such a large sprocket with a plurality of teeth. For this reason, a plurality of sprocket segments corresponding to circumferentially divided parts of a sprocket are formed by forging. The sprocket is constructed of combination of the sprocket segments.

To form sprocket segments by forging, so-called vertically and horizontally stamping methods are known (see Japanese Examined Publication TOKUKO No. H03-39773 (published on June 14th HEISEI 3 (1991)), Japanese Utility Model Laid-Open Publication JITSUYO No. S60-181238 (published on December 2nd SHOWA 60 (1985), Japanese Utility Model Laid-Open Publication JITSUYO No. S60-181239 (published on December 2nd SHOWA 60 (1985), Japanese Examined Publication TOKUKO No. H03-41251 (published on June 21st HEISEI 3 (1991)), Japanese Examined Publication TOKUKO No. H03-41252 (published on June 21st HEISEI 3 (1991)), Japanese Patent Laid-Open Publication TOKUKAI No. S52-30994 (published on March 9th SHOWA 52 (1977), Japanese Examined Publication TOKUKO No. S58-17895 (published on April 9th SHOWA 58 (1983)), Japanese Patent Laid-Open Publication TOKUKAI No. H10-137890 (published on May 26th HEISEI 10 (1998)), Japanese Patent Laid-Open Publication TOKUKAI No. S60-102247 (published on June 6th SHOWA 60 (1985)) and Japanese Patent Laid-Open Publication TOKUHYO No. H07-501492 (published on February 16th HEISEI 7 (1995))). In the vertically stamping method, forming pressure is applied to a sprocket segment in a direction perpendicular to the tooth surface of the sprocket segment. In the horizontally stamping method, forming pressure is applied to a sprocket segment in a direction parallel to the tooth surface of the sprocket segment.

SUMMARY

However, both the aforementioned conventional vertically and horizontally stamping methods of manufacturing a sprocket segment have the following problems.

That is, in the case of the vertically stamping method, since burrs are not formed on the tooth surface, the precision of the tooth surface can be high. On the other hand, since the pressure in dies is set high in order to surely fill a material into a part of the die corresponding to the tip of a tooth, there is a problem that the dies will be prone to be broken.

In the case of the horizontally stamping method, there is an advantage that under-cut is not produced in forging or the like. On the other hand, since burrs are formed substantially perpendicularly to the tooth surface, there is a problem that removal of the burrs makes it difficult to form the tooth surface with a high degree of precision.

It is an object of the present invention to provide a method of manufacturing a sprocket segment, and a sprocket segment having a tooth surface that is formed with an improved degree of precision without increasing the forming pressure of dies in forging.

A method according to a first aspect of the present invention is a method of manufacturing a sprocket segment that is formed by forging as one of a plurality of circumferentially divided parts of a sprocket having a plurality of teeth arranged on an outer peripheral surface of a circular flange. This method includes an initial forming step and a finish forming step. In the initial forming step, a material of the sprocket segment is formed into an initial formed state. In the finish forming step, the sprocket segment is subjected in dies to a finish forming process with a tooth trace direction of the sprocket segment as viewed in cross-section of the sprocket segment being inclined relative to a forging direction of the dies.

According to this construction, in a method of manufacturing a sprocket segment that is formed in an arc shape as one of circumferentially divided parts of a circular sprocket used for a lower traveling unit of a tracked vehicle such as bulldozer, after the sprocket segment is formed into the initial formed state, the tooth trace direction of the sprocket segment is inclined relative to the forging direction (compression direction) of dies as viewed in cross-section of the sprocket segment, and the sprocket segment is then subjected in the dies to a finish forging process (inclined forging). The aforementioned forging direction refers to the movement direction of the dies in operation of a forging machine such as hammer and press.

Here, "the tooth trace direction of the sprocket segment as viewed in cross-section of the sprocket segment is inclined relative to the forging direction" refers to that the sprocket segment is inclined at a predetermined angle about a line that connects the both ends of a fixing portion arranged on the inner periphery side of a plurality of teeth.

Since the sprocket segment is formed in dies with being inclined relative to the forging direction of the dies, a burr portion that will be formed in a part of the sprocket segment can be formed in a part outside the tooth surface (e.g., a part in proximity to the ridgeline of the sprocket segment). Also, since the sprocket segment is placed in an inclined orientation in the dies, it is possible to suppress increase of forming pressure as compared with the forming pressure of the vertically stamping method. As a result, the forming precision of the tooth surface can be improved. In addition, it is possible to avoid the problem that the forming pressure produced in the vertically stamping method increases.

A method of manufacturing a sprocket segment according to a second aspect of the present invention in the method of manufacturing a sprocket segment according to the first aspect of the present invention further includes a roughly forming step. The roughly forming step is performed between the initial forming step and the finish forming step for roughly forming the sprocket segment in the dies from the initial formed state to an intermediate formed state with the tooth trace direction of the sprocket segment as viewed in cross-section of the sprocket segment being inclined relative to the forging direction of the dies.

According to this construction, between a so-called busting process (initial forming step) and a finish forming process (finish forming step), the roughly forming step is performed for roughly forming the sprocket segment from the initial formed state into the intermediate formed state. In the busting process, a material is formed into the initial formed state. Also in this roughly forming step, the sprocket segment is formed in the aforementioned inclined orientation.

Since the sprocket segment is roughly formed into a certain shape close to the product in this step before the finish forming step, it is possible to a sprocket segment with a higher degree of precision.

According to a method of manufacturing a sprocket segment according to a third aspect of the present invention in the method of manufacturing a sprocket segment according to the first or second aspect of the present invention, the finish forming step includes forming a burr portion in proximity to a ridgeline of the sprocket segment when forming the sprocket segment by forging.

According to this construction, in the finish forming step for subjecting the sprocket segment to a finish forming process, when the sprocket segment is formed in dies with being inclined relative to the forging direction of the dies, burrs will be formed along a part in proximity to the ridgeline of the sprocket segment.

Here, the part in proximity to a ridgeline of the sprocket segment refers to a line extending along a ridge that connects the crests of the plurality of teeth protruding toward the outer periphery side of the sprocket segment.

Dissimilar to the case where a sprocket segment is forged by horizontally stamping method, since this construction can avoid that burrs are formed on the tooth surface of the sprocket segment, the forming precision of the tooth surface can be improved.

According to a method of manufacturing a sprocket segment according to a fourth aspect of the present invention in the method of manufacturing a sprocket segment according to the first or second aspect of the present invention, the finish forming step includes forming a burr portion in proximity to a line extending along a lateral end surface of the plurality of teeth protruding outward of the sprocket segment when forming the sprocket segment by forging.

According to this construction, in the finish forming step for subjecting the sprocket segment a finish forming process, when the sprocket segment is formed in dies with being inclined relative to the forging direction of the dies, burrs will be formed along a line in proximity to the lateral end surfaces of the sprocket segment.

Dissimilar to the case where a sprocket segment is forged by horizontally stamping method, since this construction can avoid that burrs are formed on the tooth surface of the sprocket segment, the forming precision of the tooth surface can be improved.

According to a method of manufacturing a sprocket segment according to a fifth aspect of the present invention in the method of manufacturing a sprocket segment according to the third or fourth aspect of the present invention, the finish forming step includes forming the burr portion on the mount-side end and the burr portion on the tooth-side end of the sprocket segment in a direction substantially parallel to a mount surface of one of the dies for forming the sprocket segment while the burr portion on the mount-side end and the burr portion on the tooth-side end are arranged substantially at the same height relative to the mount surface.

According to this construction, in the finish forming step for subjecting the sprocket segment a finish forming process, when the sprocket segment is formed in dies with being inclined relative to the forging direction of the dies, burrs to be formed along a part in proximity to the ridgeline or the like of the sprocket segment will be formed in a direction substantially parallel to the die mount surface.

Since deviation of the dies can be prevented when the dies are pressed toward each other to form the sprocket segment between the dies in the forging process, it is possible to form the sprocket segment with the dies being kept in balance.

A sprocket segment according to a sixth aspect of the present invention is formed by forging as one of a plurality of circumferentially divided parts of a sprocket having a plurality of teeth arranged on an outer peripheral surface of a circular flange portion. This sprocket segment includes a fixing portion, a substantially circular flange portion, a plurality of tooth parts, and a burr removal portion. The fixing portion is arranged on an innermost periphery side of the sprocket segment. The substantially circular flange portion protrudes in the axial direction of the sprocket laterally from the outer periphery side of the fixing portion. The tooth parts are spaced substantially at a constant interval away from each other along the outer peripheral surface of the flange portion and protrude in a radial direction of the sprocket. The burr removal portion is formed along one of ridgelines on the outer peripheral surface of the flange portion on which the tooth parts are formed.

According to this construction, in a sprocket segment that is formed in an arc shape as one of circumferentially divided parts of a circular sprocket used for a lower traveling unit of a tracked vehicle such as bulldozer, a burr removal portion is formed along one of the ridgelines on the outer peripheral surface of the flange portion on which the plurality of teeth are formed.

Here, the ridgeline of the sprocket segment refers to a line extending along a ridge that connects the crests of the plurality of teeth protruding toward the outer periphery side of the sprocket segment.

That is, in the sprocket segment according to the aspect of the present invention, since the sprocket segment can be formed in dies with being inclined relative to the forging direction of the dies, burrs will be formed along one of the ridgelines or the like on the outer peripheral surface of the flange portion. The burrs are removed after the sprocket segment is formed by forging. Thus, the burr removal portion is formed in the part where the burrs are removed.

Accordingly, the burr part where burrs will be formed in a part of the sprocket segment can be formed in a part outside the tooth surface (e.g., a part in proximity to the ridgeline of the sprocket segment). Since it is possible to avoid that the burr removal portion adversely affects the tooth surface of the sprocket segment, the forming precision of the tooth surface can be improved. Also, since the sprocket segment is formed in an inclined orientation in dies, it is possible to suppress increase of forming pressure as compared with the forming pressure of vertically stamping method. As a result, the forming precision of the tooth surface can be improved. In addition, it is possible to avoid the problem that the forming pressure produced in the vertically stamping method increases.

According to a sprocket segment according to a seventh aspect of the present invention in the sprocket segment according to the sixth aspect of the present invention, the burr removal portion is formed along an inner periphery side end of the fixing portion.

According to this construction, in a sprocket segment formed in an arc shape as one of circumferentially divided parts of a circular sprocket used for a lower traveling unit of a tracked vehicle such as bulldozer, a burr removal portion is formed along the inner periphery side end of the fixing portion.

That is, in the sprocket segment according to the aspect of the present invention, since the sprocket segment can be formed in dies with being inclined relative to the forging direction of the dies, burrs will be formed along the inner periphery side end of the fixing portion. The burrs are removed after the sprocket segment is formed by forging. Thus, the burr removal portion is formed in the part where the burrs are removed.

Accordingly, the burr part where burrs will be formed in a part of the sprocket segment can be formed in a part outside the tooth surface. Since it is possible to avoid that the burr removal portion adversely affects the tooth surface of the sprocket segment, the forming precision of the tooth surface can be improved. Also, since the sprocket segment is formed in an inclined orientation in dies, it is possible to suppress increase of forming pressure as compared with the forming pressure of vertically stamping method. As a result, the forming precision of the tooth surface can be improved. In addition, it is possible to avoid the problem that the forming pressure produced in the vertically stamping method increases.

DETAILED DESCRIPTION OF THE PREFERRED EMBODIMENTS

With reference to FIGS. 1 to 11, the following description will describe a method of manufacturing a sprocket segment 10, and a bulldozer 1, which includes the sprocket segments 10 manufactured by this method according to an embodiment of the present invention.

Construction of Bulldozer 1

Figure 1:
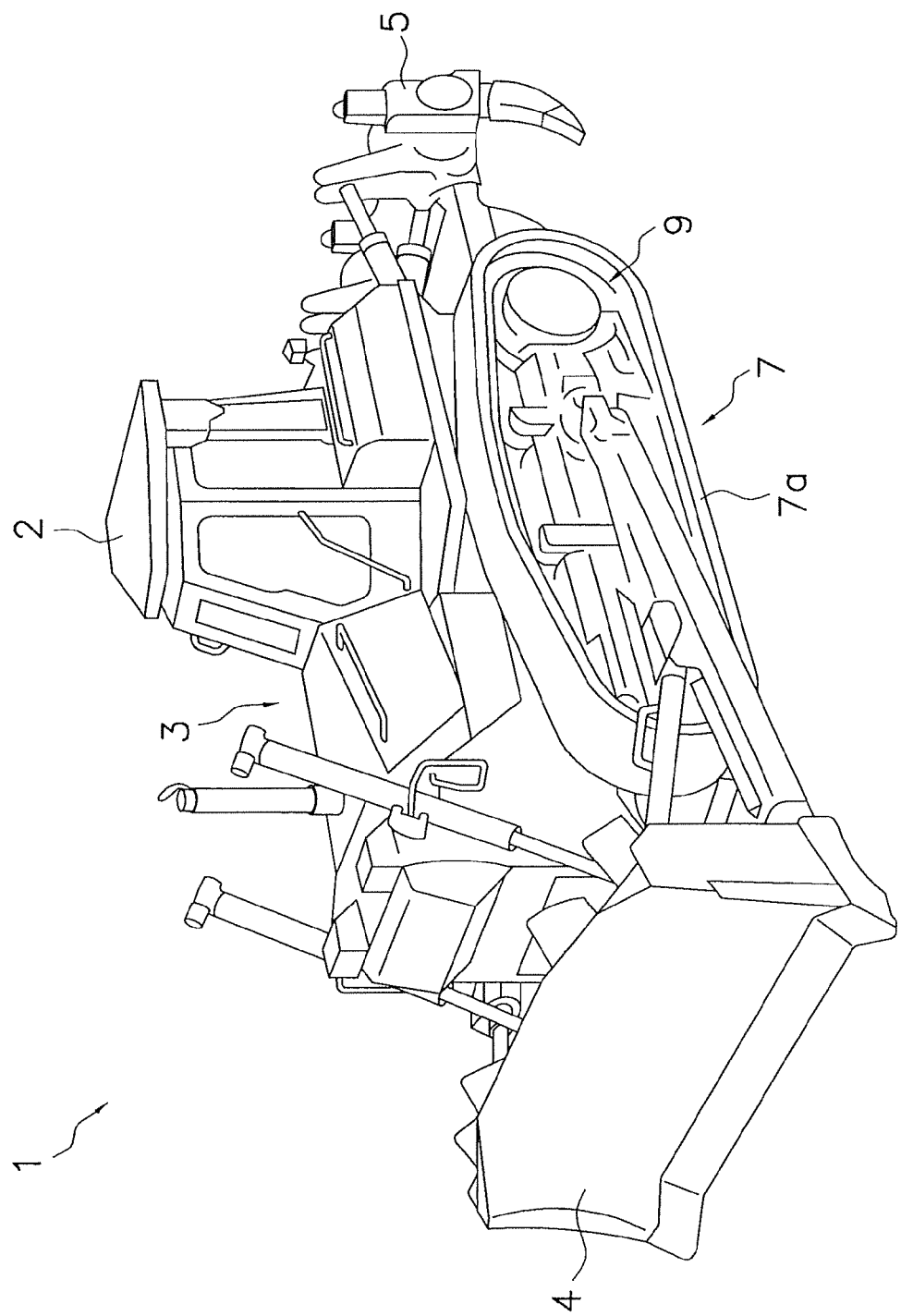
FIG. 1 is a perspective view showing the construction of a bulldozer with a sprocket employing sprocket segments according to an embodiment of the present invention.
Figure 2:
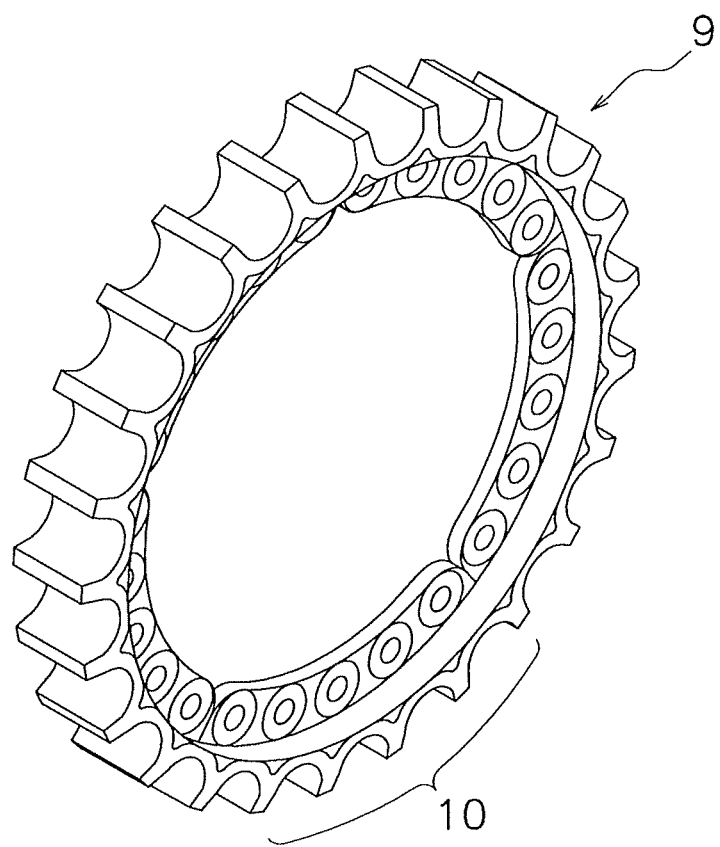
FIG. 2 is a perspective view showing the construction of the sprocket installed on the bulldozer shown in FIG. 1.
Figure 3:
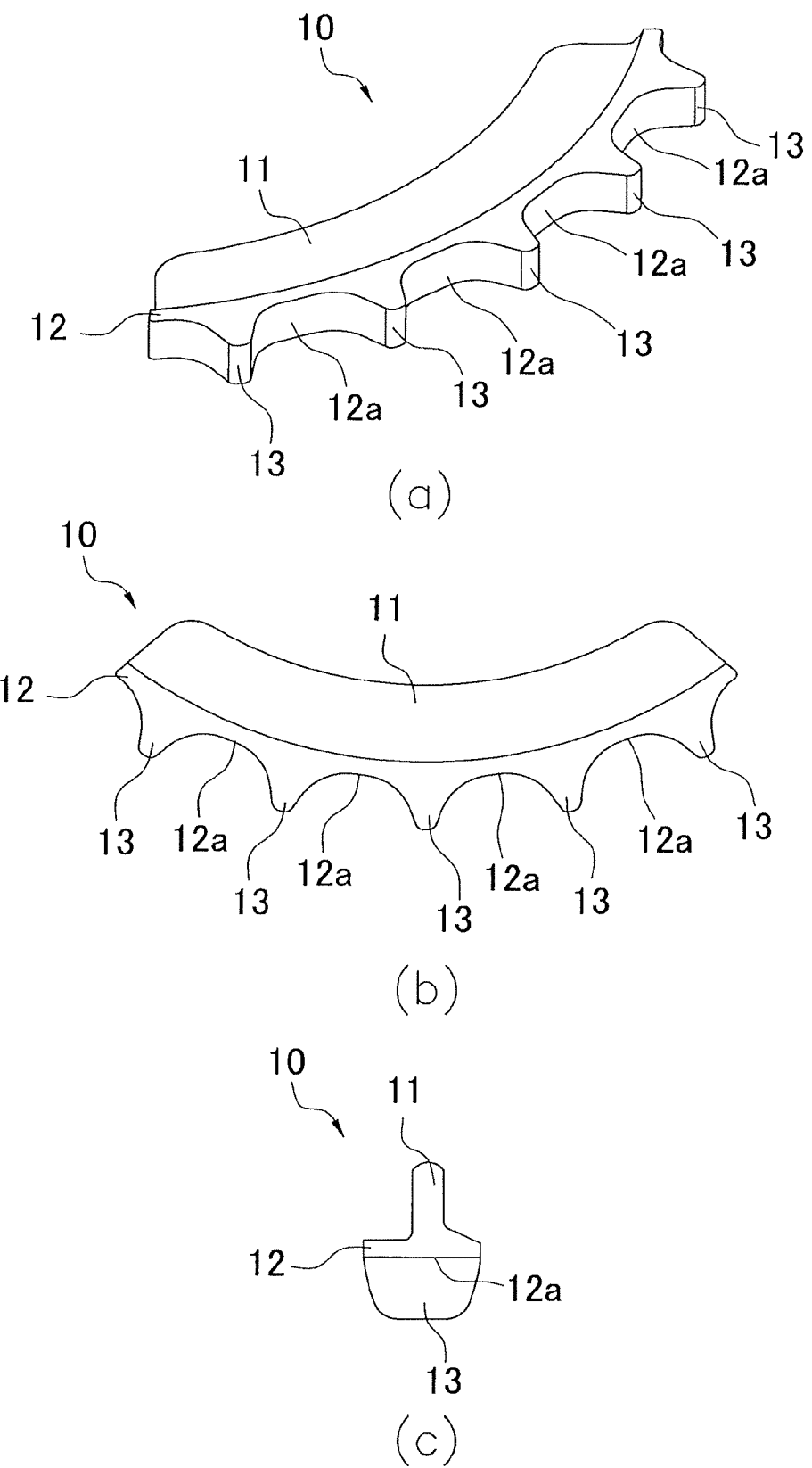
FIGS. 3(a) to 3(c) are perspective, front and side views showing the entire construction of the sprocket segment, which composes the sprocket shown in FIG. 2.

The bulldozer 1 according to this embodiment is a construction machine that levels rough ground, and mainly includes a cab 2, a main unit frame 3, a blade 4, a ripper (working unit) 5, and a traveling unit 7 as shown in FIG. 1.

The cab 2 includes an operator seat (driver's seat) on which a driver (operator) sits, and levers, pedals, meters and the like for various types of operation.

Working equipment such as blade 4 and ripper 5, and the traveling unit 7 are mounted to the main unit frame 3. The cab 2 is installed on the upper part of the main unit frame 3.

The blade 4 is a working unit that is mounted to the front part of the main unit frame 3 to dig in the ground and to push the dug soil. The blade 4 is driven by hydraulic cylinders by actuation of a blade operating lever.

The ripper 5 is mounted to the rear part of the main unit frame 3. The tips of the ripper 5 as shank parts protrude downward substantially in the vertical direction. The ripper rips or crushes a rock and the like by traction force of the traveling unit 7 with its shanks parts piercing the rock and the like. Also, similar to the blade 4, the ripper 5 is driven by hydraulic cylinders by actuation of a ripper operating lever.

The traveling unit 7 allows the vehicle to travel on rough ground by rotation of sprockets 9 (see FIG. 2) for moving a pair of endless crawler belts 7a that are mounted to right and left lower parts of the main unit frame 3.

Construction of Sprocket Segment 10

As shown in FIGS. 2 and 3(a) to 3(c), the sprocket segment 10 according to this embodiment composes one of circumferentially divided parts of the sprocket 9 used for the lower traveling unit of a tracked vehicle such as the bulldozer 1. The sprocket segment 10 is a substantially arc-shaped member having five teeth, and is formed from chromium molybdenum steel.

The specific components of this sprocket segment 10 includes C (0.4 wt %), Si (0.2 wt %), Mn (1.45 wt %), P (0.01 wt %), S (0.01 wt %), Cr (0.18 wt %), Mo (0.03 wt %) and B (0.0015 wt %). The rest of the content of this sprocket segment 10 includes Fe and unavoidable impurities.

The sprocket segment 10 is integrally formed of a fixing portion 11, a flange portion 12, five teeth 13 (one example of the tooth parts), and a burr removal portion 21 (see FIG. 5(b)).

The fixing portion 11 composes a part of the circular sprocket to be fixed to a driving portion of the lower traveling unit after the circular sprocket is assembled by combination of the sprocket segments 10. As shown in FIGS. 3(a) to 3(c), the fixing portion 11 is arranged in the radially innermost part (innermost periphery side) of the substantially arc-shaped sprocket segment 10, and protrudes toward the inner periphery side.

As shown in FIG. 3(c) or the like, the flange portion 12 is arranged on the radially outer side (outer periphery side) of the fixing portion 11, and is formed protruding laterally in the axial direction of the substantially arc-shaped sprocket segment 10.

The five teeth 13 are formed protruding radially outward from the outermost peripheral surface (tooth surface 12a) of the sprocket segment 10.

The burr removal portion 21 is a removal processing mark that appears after a burr portion 14 (see FIG. 4) is removed by machining. The burr portion 14 will be formed when the sprocket segment is formed by forging. As shown in FIG. 5(b), the burr removal portion 21 is formed along a part extending in proximity to a ridgeline of the sprocket segment 10.

Figure 4:
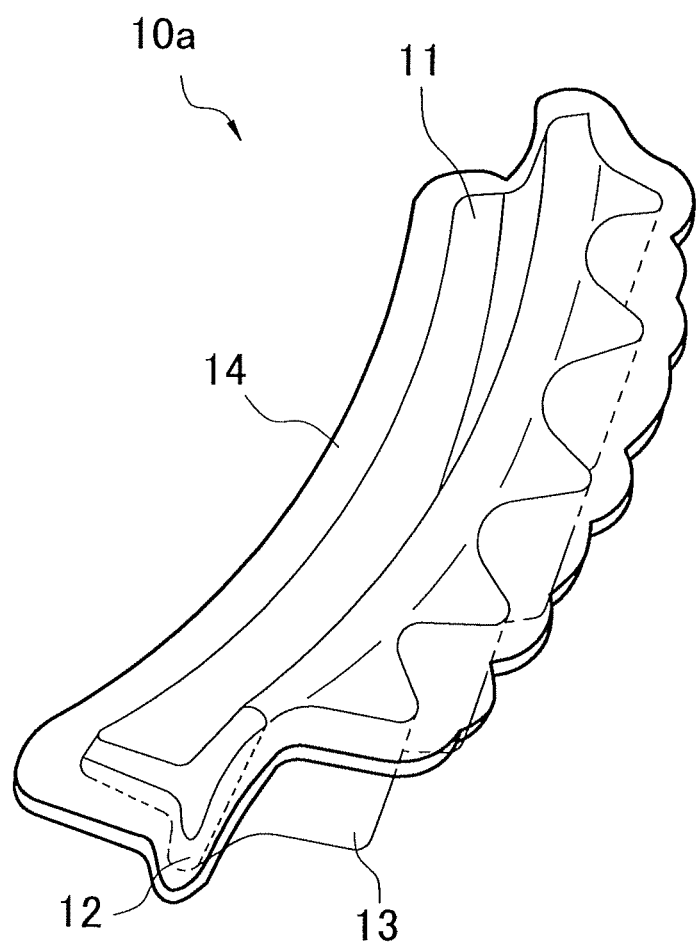
FIG. 4 is a perspective view showing the construction of the sprocket segment shown in FIG. 3 after the sprocket segment is formed by forging.
Figure 5:
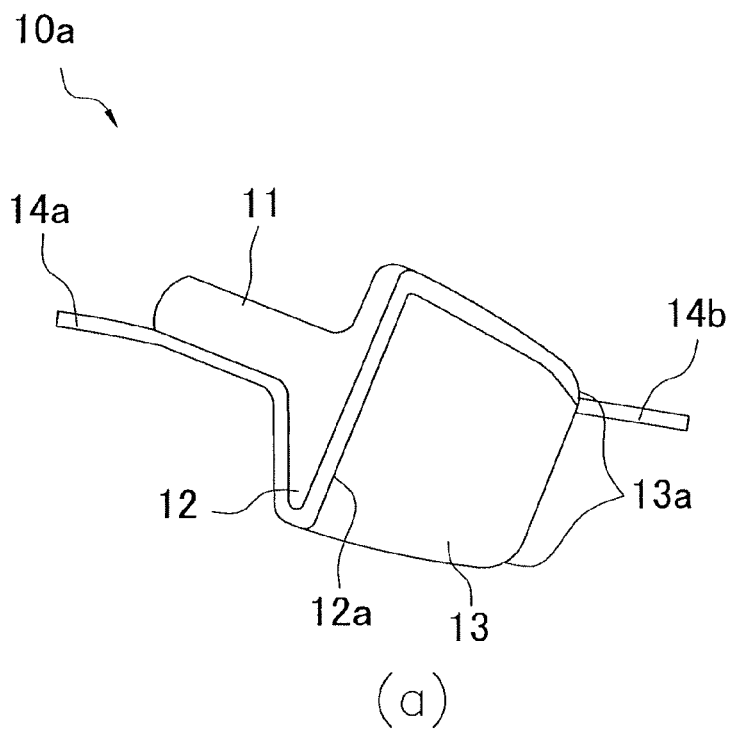
FIG. 5 is a side view showing the construction of the sprocket segment after the sprocket segment is formed by forging shown in FIG. 4.
Figure 5:
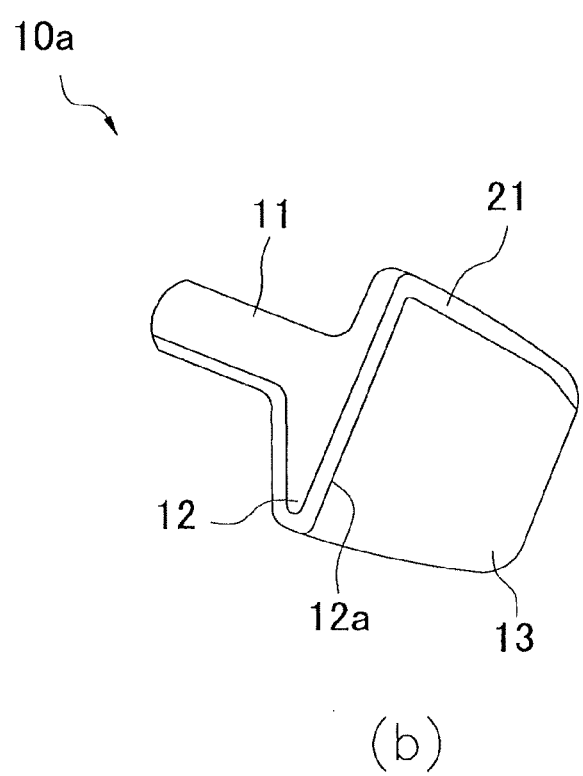

As shown in FIG. 4, the burr portion 14 will be formed from the part in proximity to the ridgeline of the sprocket segment 10 through the side surface parts to the end of the fixing portion 11 in a finish forming process (forging). In this embodiment, the burr portion 14 is formed in one of R parts (rounded parts) 13a or a part of the side surface arranged outside the R part, which is located in the aforementioned part in proximity to the ridgeline. The R parts are formed on the ends in the width direction (lateral ends) of the tooth 13. Accordingly, the burr portion 14 does not affect the tooth surface 12a. Therefore, the tooth surface 12a and the teeth 13 can be formed with high precision.

Here, the part in proximity to the ridgeline of the sprocket segment 10 refers to a part in proximity to a line extending along a ridge that connects the crests formed by the five teeth 13. Since it is possible to avoid that the burr portion 14 adversely affects the tooth surface 12a of the sprocket segment 14, the forming precision of the tooth surface 12a can be improved. Die equipment (dies for manufacturing sprocket segment) 50 and manufacturing processes will be described later for manufacturing a material to be formed 10a for the sprocket segment 10 including the burr portion 14.

Die Equipment 50 For Manufacturing Sprocket Segment 10

Figure 6:
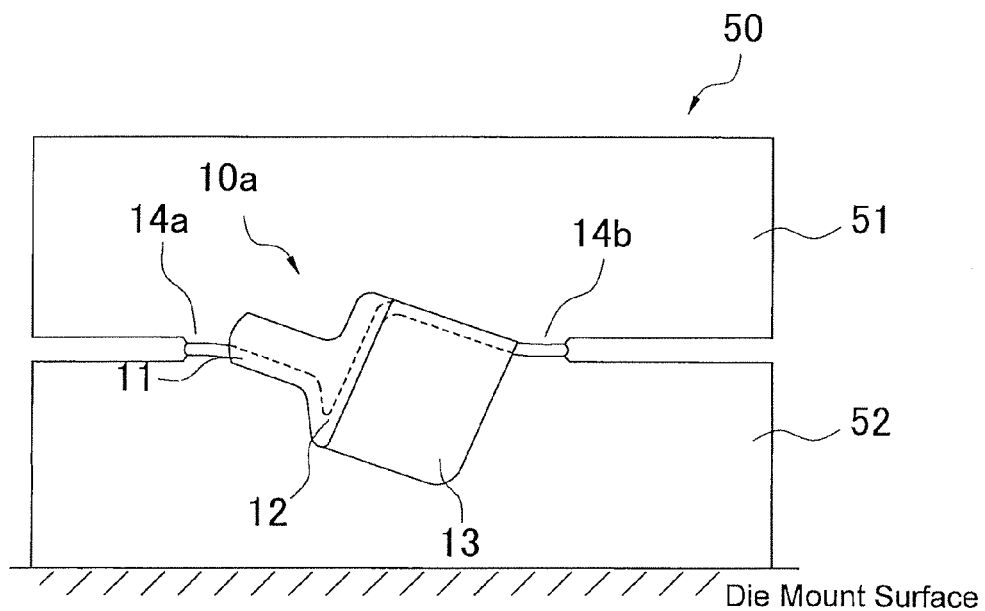
FIG. 6 is a diagram schematically showing the construction of dies for forming the sprocket segment shown in FIG. 4 by forging.

In this embodiment, the die equipment 50 for manufacturing the sprocket segment shown in FIG. 6 is used in the manufacturing processes of the sprocket segment 10, which has the aforementioned construction.

The die equipment 50 includes first and second dies 51 and 52 as upper and lower dies. With the tooth trace direction of the sprocket segment being inclined at a predetermined angle about a line that connects the both ends of the fixing portion 11, the sprocket segment 10 is formed in the die equipment 50 by forging (roughly and finish forming processes). Since the sprocket segment 10 is placed in the die equipment 50 in the inclined orientation in forging, the burr portion 14 can be formed along a part extending in proximity to the ridgeline of the sprocket segment 10 outside the tooth surface 12a. The die equipment can be simple without consideration of design of a shape or margin for providing the draft angle. The reason is that the draft angle can simply provided by the tooth surface inclined relative to the forging direction in the die equipment 50.

Figure 7:
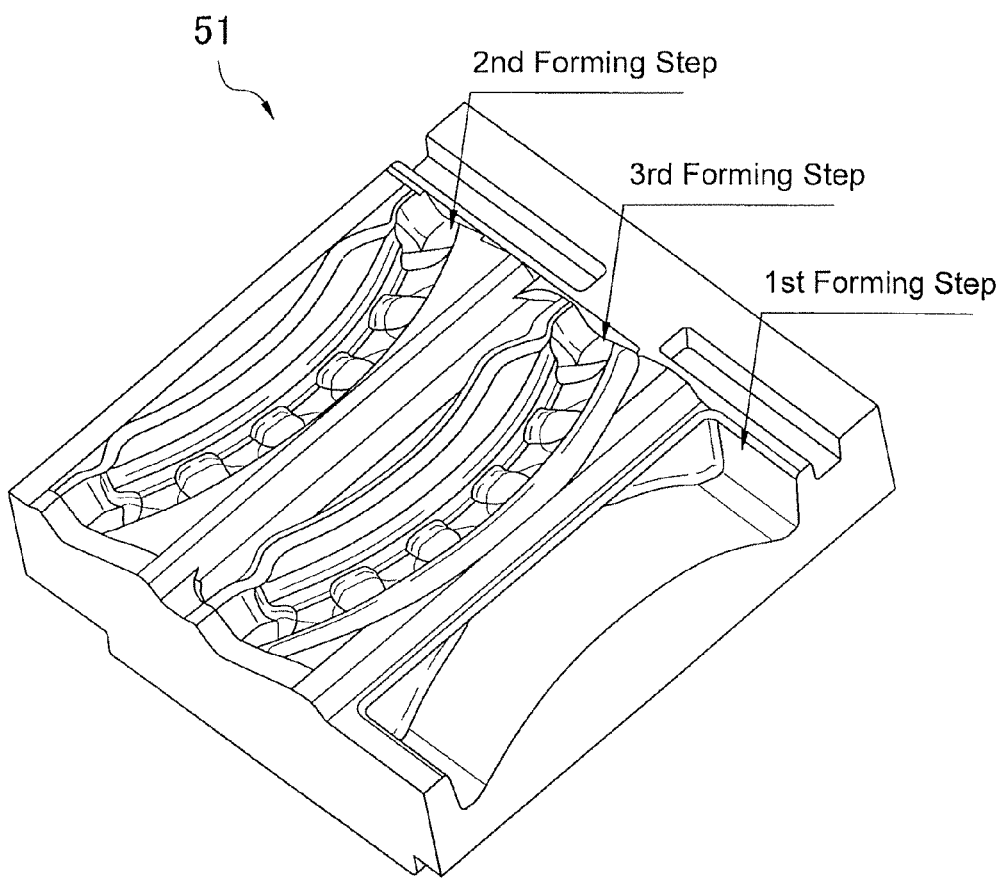
FIG. 7 is a perspective view showing a first die arranged as the upper die shown in FIG. 6.

The first die 51 is provided as the upper die of the die equipment 50, as shown in FIG. 6. As shown in FIG. 7, the first die 51 has diesinking for forming the sprocket segment step by step in three steps (busting, roughly forming, finish forming).

Figure 8:
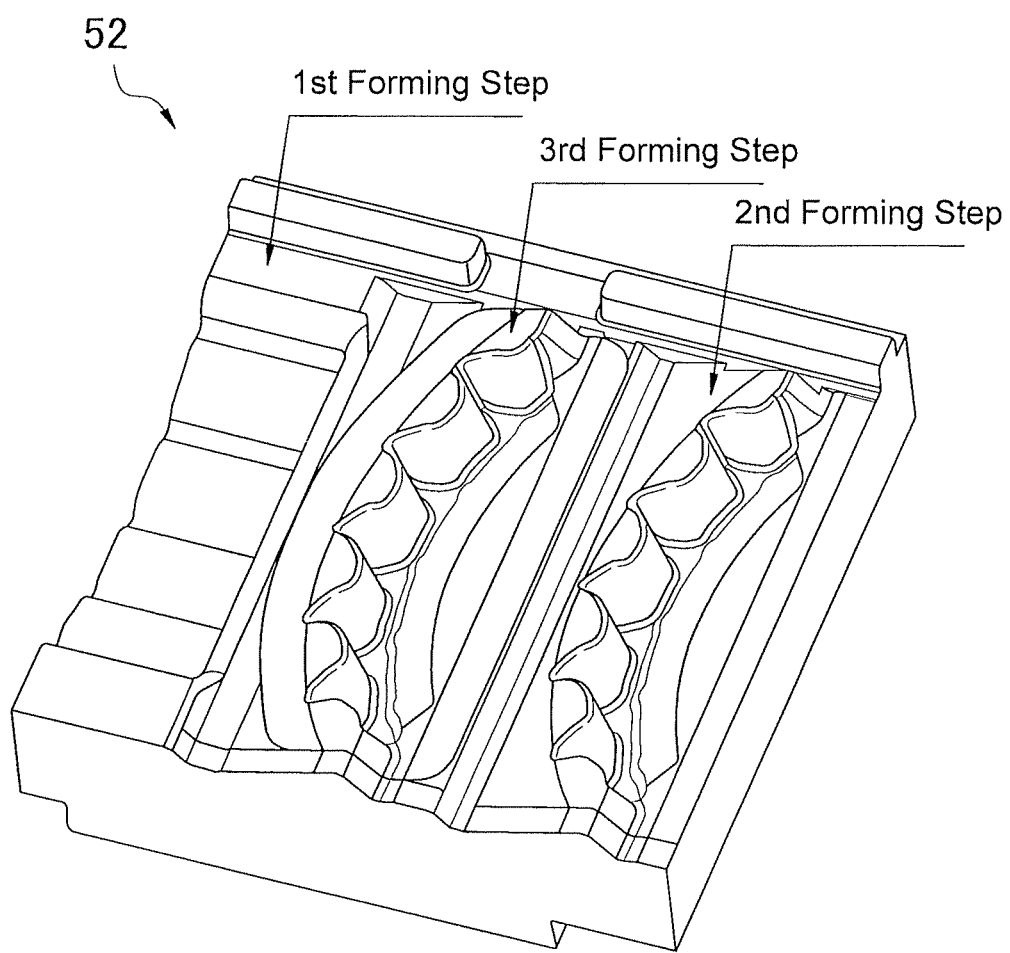
FIG. 8 is a perspective view showing a second die arranged as the lower die shown in FIG. 6.

The second die 52 is provided as the lower die of the die equipment 50, as shown in FIG. 6. As shown in FIG. 8, the second die 52 has diesinking for forming the sprocket segment step by step in three steps (busting, roughly forming, finish forming) similar to the first die 51.

In the roughly forming process as second forming step and the finish forming process as third forming step, the sprocket segment 10 is formed between the first die 51 (see FIG. 7) and the second die 52 (see FIG. 8) by forging with the tooth trace direction being inclined relative to the forge direction. The inclination angle of the sprocket segment 10 in the die equipment 50 in the forging is set as an angle that allows the aforementioned burr portion 14 to be formed in a part outside the tooth surface 12a, that is, along a part extending in proximity to the ridgeline.

In addition, as shown in FIG. 6, in the die equipment 50 according to this embodiment, in the aforementioned burr portion 14, a fixing portion 11 side burr section 14a and a tooth 13 side burr section 14b are formed substantially in parallel to the die mount surface.

Method of Manufacturing Sprocket Segment 10

Processes of manufacturing the aforementioned sprocket segment 10 are now described with reference to FIGS. 9 to 11.

Figure 9:
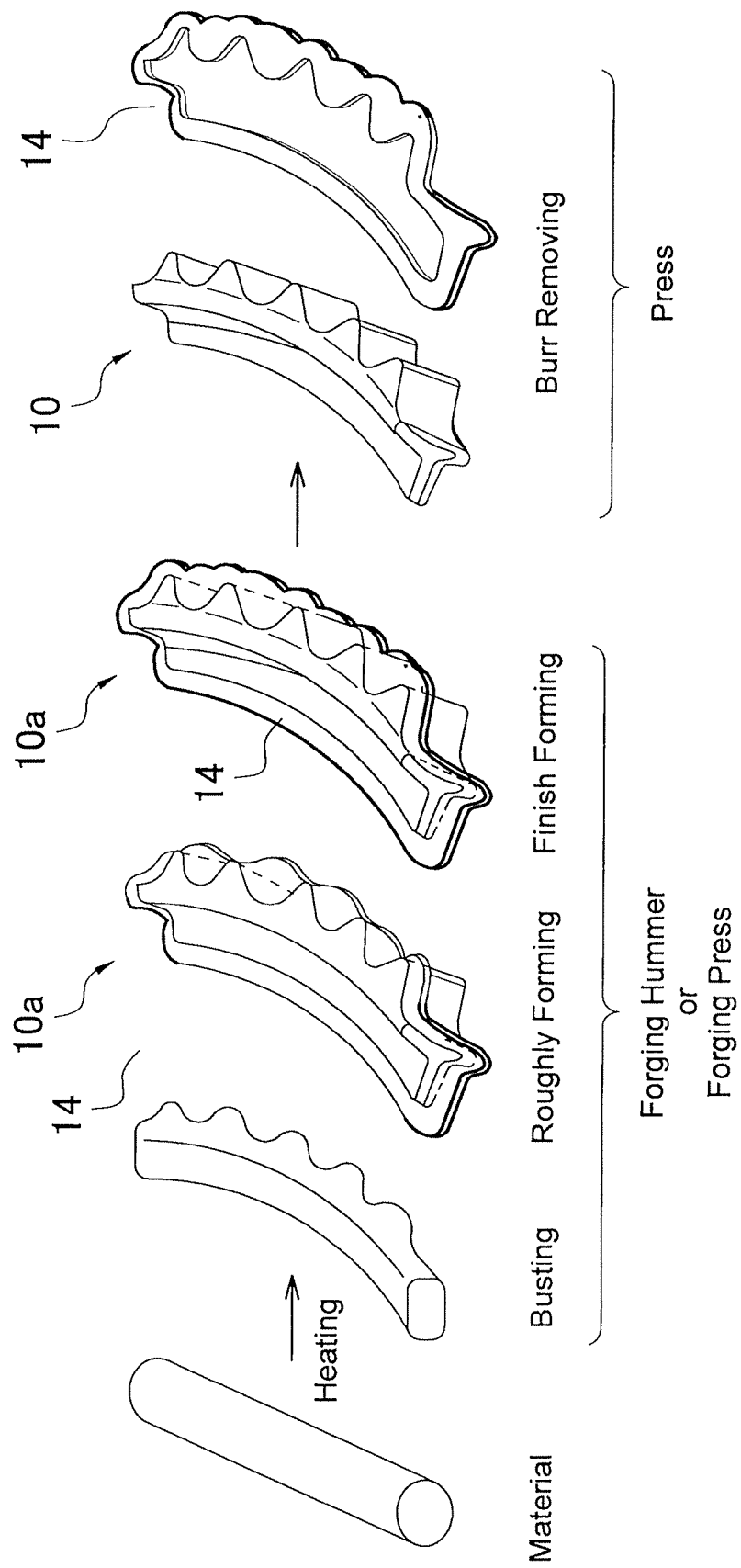
FIG. 9 is a diagram illustrating the flow of the processes of manufacturing the sprocket segment shown in FIG. 3.
Figure 10:
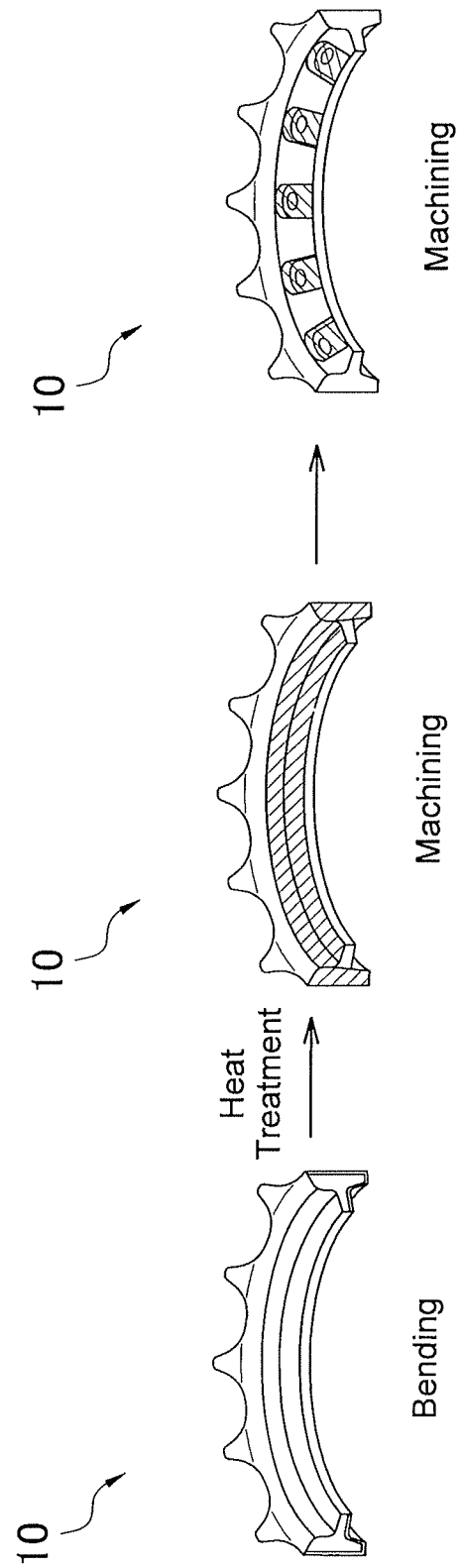
FIG. 10 is a diagram illustrating the flow of the processes of manufacturing the sprocket segment shown in FIG. 3.

That is, according to the sprocket segment 10 of this embodiment, a round rod material is subjected to processes as shown in FIGS. 9 and 10 to be formed into the sprocket segment 10.

Figure 11:
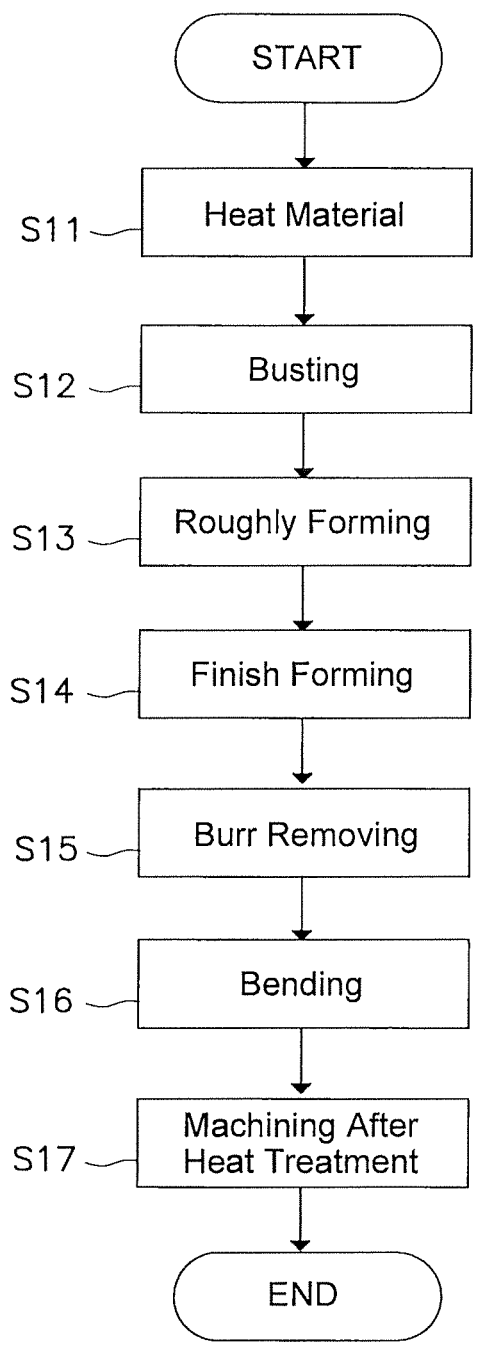
FIG. 11 is a flowchart showing the processes of manufacturing the sprocket segment shown in FIG. 3.

Specifically, as shown in the flowchart of FIG. 11, the material is first heated in Step S11.

Subsequently, in Step S12, the heated round rod material is subjected to busting in a first forming step in the die equipment 50 installed in a forging machine such as hammer and press so that the heated round rod material is formed into a pre-formed shape that is prepared for roughly forming the sprocket segment 10 as shown in FIG. 9.

Subsequently, in Step S13, the material to be formed after busting is roughly formed into a roughly-formed shape in the die equipment 50 by using forging hammer as shown in FIG. 9 (a second forming step). In this step, the burr portion 14 will be formed in the material to be formed 10a along a part extending in proximity to the ridgeline.

Subsequently, in Step S14, the material to be formed 10a after roughly forming is subjected to finish forming of a third forming step in the die equipment 50 by using forging hammer as shown in FIG. 9.

Subsequently, in Step S15, as shown in FIG. 9, the burr portion 14 of the material to be formed 10a after finish forming is removed by a press. Thus, the sprocket segment 10 is formed.

After that, in Step S16, as shown in FIG. 10, among the plurality of teeth 13 included in the sprocket segment 10, teeth 13 on the both ends of the sprocket segment 10 are bent to be arranged at proper positions.

Finally, in Step S17, the sprocket segment 10 is heat-treated, and bolt holes and the like are formed by machining as shown in FIG. 10.

Features of Sprocket Segment 10 Manufacturing Method (1) In the method of manufacturing the sprocket segment 10 according to this embodiment, as shown in FIGS. 9 to 11, in the die equipment 50, a round rod material is first subjected to busting (Step S12), and is then roughly formed with the tooth trace direction of the sprocket segment 10 being inclined relative to the forge direction (Step S13), and subsequently the roughly formed material is subjected to finish forming (Step S14) so that the sprocket segment 10 with five teeth is formed.

According to this embodiment, a burr portion, which will be formed on the tooth surface in the horizontally stamping method, can be formed outside the tooth surface, for example, can be formed along a part extending in proximity to the ridgeline of the sprocket segment 10 as shown in FIG. 4, or the like. Therefore, it is possible to reduce the forming pressure in the die equipment 50 as compared with the vertically forging method, and to improve the forming precision of the tooth surface 12a as compared with the horizontally forging method.

In addition, since the sprocket segment is formed in the die equipment 50 with the tooth trace direction being inclined relative to the forging direction, the tooth surface serves as the draft angle. As a result, there is an advantage that the die equipment can be simple without requirement of design of a shape or margin for providing the draft angle and of machining after forging.

(2) In the method of manufacturing the sprocket segment 10 according to this embodiment, as shown in FIG. 4, the burr portion 14, which will be formed in roughly forming and finish forming of forging processes, is arranged along the ridgeline of the sprocket segment 10.

According to this embodiment, it is possible to avoid that the burr portion 14 affects the tooth surface 12a or the tooth 13. Therefore, it is possible to form the sprocket segment 10 with high precision.

(3) In the method of manufacturing the sprocket segment 10 according to this embodiment, as shown in FIG. 4, the burr portion 14 will be formed along a part extending in proximity to the R part 13a formed on the lateral end of the tooth 13.

According to this embodiment, it is possible to avoid that the burr portion 14 affects the tooth surface 12a or the tooth 13. Therefore, it is possible to form the sprocket segment 10 with high precision.

(4) In the method of manufacturing the sprocket segment 10 according to this embodiment, as shown in FIG. 4, the burr portion 14 will be formed in a part close to the lateral end of the tooth 13.

According to this embodiment, it is possible to avoid that the burr portion 14 affects the tooth surface 12a or the tooth 13. Therefore, it is possible to form the sprocket segment 10 with high precision.

(5) In the method of manufacturing the sprocket segment 10 according to this embodiment, as shown in FIG. 6, the burr portion 14 will be formed substantially in parallel to the mount surface of the die equipment 50.

Since deviation of the dies can be prevented when the sprocket segment is formed in the dies by forging, it is possible to form the sprocket segment with the dies being kept in balance.

(6) In the die equipment for manufacturing the sprocket segment 10 according to this embodiment, as shown in FIG. 6, a material to be formed 10a of the sprocket segment 10 is formed with being inclined relative to the forging direction between the first and second dies 51 and 52.

According to this embodiment, a burr portion, which will be formed on the tooth surface in the horizontally stamping method, can be formed outside the tooth surface, for example, can be formed along a part extending in proximity to the ridgeline of the sprocket segment 10 as shown in FIG. 4, or the like. Therefore, it is possible to suppress the forming pressure in the die equipment 50 as compared with the vertically forging method, and to improve the forming precision of the tooth surface 12a as compared with the horizontally forging method.

(7) As shown in FIGS. 4 and 5(b), the sprocket segment 10 according to this embodiment includes the fixing portion 11 arranged on the innermost periphery side of the sprocket segment, the flange portion 12 formed protruding in the axial direction of the sprocket laterally from the outer periphery side of the fixing portion 11, and five teeth 13 protruding outward in the radial direction of the sprocket from the outer peripheral surface of the flange portion 12 (tooth surface 12a). The burr removal portion 21, which is formed by removing the burr portion 14, is formed along a part extending in proximity to the ridgeline of the sprocket segment 10.

According to this embodiment, it is possible to avoid that the burr removal portion 21 affects the tooth surface 12a, the tooth 13 or the like. Therefore, it is possible to form the tooth surface 12a or the like with high precision.

Other Embodiments

The above description has described an exemplary embodiment according to the present invention. However, the present invention is not limited to the foregoing embodiment. Various changes and modifications can be made without departing from the spirit of the present invention.

(A) The method of manufacturing the sprocket segment 10 with five teeth according to the foregoing embodiment has been illustratively described. However, the present invention is not limited to this construction.

Figure 12:
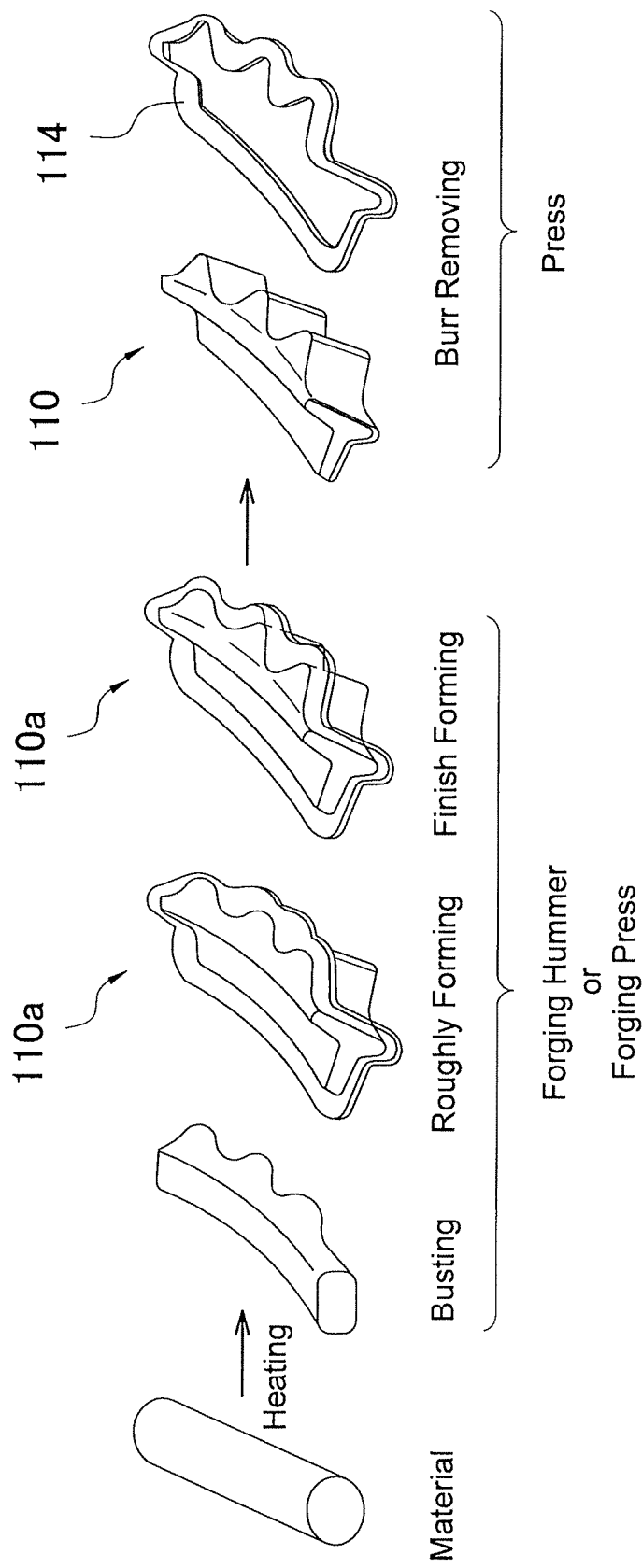
FIG. 12 is a diagram illustrating the flow of the processes of manufacturing a sprocket segment having three teeth according to another embodiment of the present invention.

For example, as shown in FIG. 12, a sprocket segment 110 with three teeth can be formed by removing a burr portion 114 from a material to be formed 110a.

(B) In the foregoing embodiment, three processes of busting, roughly forming and finish forming processes have been illustratively described. However, the present invention is not limited to this construction.

For example, the roughly forming process may be omitted so that the sprocket segment is formed by two processes of busting and finish forming processes.

(C) In the foregoing embodiment, the burr portion 14 has been illustratively described to be formed in the forging process substantially in parallel to the mount surface for the die equipment 50. However, the present invention is not limited to this construction.

For example, the burr portion may be formed at an inclination angle relative to the die mount surface.

Since a method of manufacturing a sprocket segment according to the illustrated embodiment has effects that the forming precision of a tooth surface can be improved and that it is possible to avoid a problem that the forming pressure produced in the vertically stamping method increases, the method of manufacturing a sprocket segment can be widely applied to methods of manufacturing sprocket segments of a sprocket used for various types of vehicles.

The invention claimed is:

1. A method of manufacturing a sprocket segment that is formed by forging as one of a plurality of circumferentially divided parts of a sprocket having a plurality of teeth arranged on an outer peripheral surface of a circular flange, the method comprising:
   forming a material of the sprocket segment into an initial formed state in an initial forming step; and
   subjecting the sprocket segment in dies to a finish forming process with a tooth trace direction of the sprocket segment as viewed in cross-section of the sprocket segment being inclined relative to a forging direction of the dies in a finish forming step, one of the dies being mounted to a mount surface and disposed between the mount surface and another of the dies,
   the finish forming step including forming a burr portion in proximity to a ridgeline of the sprocket segment when forming the sprocket segment by forging, a portion of the burr portion on a mount-side end of the sprocket segment and a portion of the burr portion on a tooth-side end of the sprocket segment being parallel to the mount surface of the dies, the ridgeline being disposed between a radially-facing tooth surface and an axially-facing lateral end surface of the teeth.

2. The method of manufacturing a sprocket segment set forth in claim 1, further comprising between the initial forming step and the finish forming step, roughly forming the sprocket segment in the dies from the initial formed state to an intermediate formed state with the tooth trace direction of the sprocket segment as viewed in cross-section of the sprocket segment being inclined relative to the forging direction of the dies.

3. The method of manufacturing a sprocket segment set forth in claim 1, wherein the burr portion on the mount-side end and the burr portion on the tooth-side end are arranged substantially at the same height relative to the mount surface.

4. A method of manufacturing a sprocket segment that is formed by forging as one of a plurality of circumferentially divided parts of a sprocket having a plurality of teeth arranged on an outer peripheral surface of a circular flange, the method comprising:

forming a material of the sprocket segment into an initial formed state in an initial forming step; and subjecting the sprocket segment in dies to a finish forming process with a tooth trace direction of the sprocket segment as viewed in cross-section of the sprocket segment being inclined relative to a forging direction of the dies in a finish forming step, one of the dies being mounted to a mount surface and disposed between the mount surface and another of the dies, the finish forming step including forming a burr portion in proximity to a line extending along a lateral end surface of the teeth protruding outward of the sprocket segment when forming the sprocket segment by forging, a portion of the burr portion on a mount-side end of the sprocket segment and a portion of the burr portion on a tooth-side end of the sprocket segment being parallel to the mount surface of the dies.

5. The method of manufacturing a sprocket segment set forth in claim 4, further comprising between the initial forming step and the finish forming step, roughly forming the sprocket segment in the dies from the initial formed state to an intermediate formed state with the tooth trace direction of the sprocket segment as viewed in cross-section of the sprocket segment being inclined relative to the forging direction of the dies.

6. The method of manufacturing a sprocket segment set forth in claim 4, wherein the burr portion on the mount-side end and the burr portion on the tooth-side end are arranged substantially at the same height relative to the mount surface.

* * * * *